United States Patent [19]

Rokukawa

[11] Patent Number: 5,945,077

[45] Date of Patent: Aug. 31, 1999

[54] SEPARATION OF COPPER FROM CHALCOPYRITE USING HYDROCHLORIC ACID

[75] Inventor: Naganori Rokukawa, Tsuchiura, Japan

[73] Assignee: Director-General of Agency of Industrial Science and Technology, Japan

[21] Appl. No.: 09/028,347

[22] Filed: Feb. 24, 1998

[30] Foreign Application Priority Data

May 13, 1997 [JP] Japan .................................. 9-137740

[51] Int. Cl.[6] .................................................. C22B 15/00
[52] U.S. Cl. ............................................................ 423/39
[58] Field of Search ................................ 423/38, 39, 40, 423/46

[56] References Cited

U.S. PATENT DOCUMENTS

| | | | |
|---|---|---|---|
| 874,496 | 12/1907 | Gates et al. | 423/38 |
| 972,149 | 10/1910 | Baker | 423/46 |
| 1,571,502 | 2/1926 | Venn-Brown | 423/40 |
| 1,833,685 | 11/1931 | Meyer | 423/46 |
| 3,896,208 | 7/1975 | Dubeck et al. | 423/34 |
| 3,923,616 | 12/1975 | Atadan et al. | 423/39 |
| 3,985,555 | 10/1976 | Shirts et al. | 423/48 |
| 3,988,417 | 10/1976 | Polinsky | 423/40 |

FOREIGN PATENT DOCUMENTS 20702  11/1901  United Kingdom ..................... 423/38

*Primary Examiner*—Steven Bos
*Attorney, Agent, or Firm*—Lorusso & Loud

[57] ABSTRACT

A method of separating copper from chalcopyrite, including heating a mixture containing chalcopyrite particles containing copper components and hydrochloric acid at a temperature of at least 110° C. for a period of time sufficient to convert the copper components into a water-soluble state. The heated mixture is then mixed with water to leach out the water-soluble copper components from the particles into water.

8 Claims, No Drawings

SEPARATION OF COPPER FROM CHALCOPYRITE USING HYDROCHLORIC ACID

BACKGROUND OF THE INVENTION

This invention relates generally to a method of separating copper from a low grade copper ore and, more specifically, a wet method for the lixivation of copper from chalcopyrite.

In the separation of copper from a high grade copper ore such as chalcocite $CuS_2$, covellite $CuS$ or bornite $Cu_5FeS_4$, a dry method is generally adopted. Because of a high energy cost, the dry method is not employed for the separation of copper from a low grade copper ore such as chalcopyrite ($CuFeS_2$). It is well known in the art that copper cannot be leached out from chalcopyrite with an acid alone. Thus, a method is proposed in which the lixivation is carried out using an aqueous sodium chloride solution containing cupric chloride as an oxidation agent. Also known is a wet method in which an aqueous ferric chloride solution is used as a lixivation liquid. The former method is, however, disadvantageous because copper is used for the lixivation of copper. The latter method has a problem that the a large amount of ferric ion is present in the leached product.

SUMMARY OF THE INVENTION

It is, therefore, an object of the present invention to provide a method which can separate copper from a low grade copper ore, chalcopyrite, by lixivation at a low cost with a high yield.

Another object of the present invention is to provide a method of the above-mentioned type which does not require the addition of a metal compound in a lixivation liquid.

In accomplishing the foregoing objects, there is provided in accordance with the present invention a method of separating copper from chalcopyrite, comprising the steps of:

(a) heating a mixture containing chalcopyrite particles containing copper components and hydrochloric acid at a temperature of at least 110° C. for a period of time sufficient to convert the copper components into a water-soluble state; and (b) mixing said heated mixture with water to leach out said water-soluble copper components from said particles into water.

Other objects, features and advantages of the present invention will become apparent from the detailed description of the preferred embodiments of the invention to follow.

DETAILED DESCRIPTION OF THE PREFERRED EMBODIMENTS OF THE INVENTION

In the present invention, copper components-containing chalcopyrite particles having a particle size of preferably 150 μm or less, more preferably 70 μm or less are used as a raw material. The chalcopyrite particles are placed in a vessel to which hydrochloric acid having a concentration of preferably at least 4 mole/$dm^3$, more preferably 6–12 mole/$dm^3$ is added. The hydrochloric acid is preferably used in an amount sufficient for all of the chalcopyrite particles to be immersed therein. From the stand point of economy, the hydrochloric acid is used in an amount less than about twice the volume (bulk volume) of the chalcopyrite particles.

The mixture of the chalcopyrite particles and hydrochloric acid in the vessel is then heat-treated at a temperature of at least 110° C. after closing the vessel for a period of time sufficient to convert the copper components of the chalcopyrite particles into a water-soluble state. The heat treatment is preferably performed at a temperature of 120–140° C. for 1–6 hours, more preferably 2–4 hours under an autogeneous pressure.

The heat-treated mixture is then mixed with water to form a pulp. The pulp is stirred to lixivate or leach out the solubilized copper components from the particles into water. Generally, the lixivation is performed at room temperature and ambient pressure. The water is preferably used in an amount so that the pulp has a density (concentration) of 10–100 g/$dm^3$. Thereafter, the pulp is subjected to solid-liquid separation, such as filtration, to remove the solid residue. The copper in the liquid phase is recovered by any known method such as by solvent extraction or electrolysis.

The following examples will further illustrate the present invention.

EXAMPLE 1

Chalcopyrite particles (1 g; particle diameter: 200 mesh (74 μm) or finer and 2 $cm^3$ of 6 mol/$dm^3$ hydrochloric acid were charged in a glass vessel. The vessel was closed and placed in a thermostat oven and heated at 120° C. for a period of time as shown in Table 1. Thereafter, the glass vessel was cooled to room temperature and water is added thereto to form a pulp having a concentration of 10 g/$dm^3$. The pulp was stirred for 1 hour to leach out solubilized copper. Then, the pulp was filtered and the liquid phase was measured for the content (lixivation yield Y) of copper. The lixivation yield Y was measured by ICP (inductively coupled plasma) emission spectrometry and calculated as follows:

$$Y = W_1/W_0 \times 100 (\%)$$

wherein $W_1$ represents the amount of copper contained in the liquid phase and $W_0$ represents the amount of copper contained in the raw material chalcopyrite. The results are also summarized in Table 1.

TABLE 1

| Heating Time (hour) | Lixivation Yield (%) |
|---|---|
| 0.25 | 40.0 |
| 0.5 | 70.6 |
| 1 | 89.6 |
| 2 | 97.0 |
| 3 | 98.1 |
| 4 | 99.0 |
| 6 | 99.8 |
| 8 | 99.9 |

EXAMPLE 2

Example 1 was repeated in the same manner as described except that the heat treatment time was 3 hours and the heat treatment temperature was as shown in Table 2. The lixivation yields at various temperatures are shown in Table 2.

TABLE 2

| Heating Temperature (° C.) | Lixivation Yield (%) |
|---|---|
| 60 | 82.3 |
| 70 | 85.6 |
| 80 | 88.3 |

TABLE 2-continued

| Heating Temperature (° C.) | Lixivation Yield (%) |
|---|---|
| 90 | 91.4 |
| 100 | 94.3 |
| 110 | 97.3 |
| 120 | 98.2 |
| 130 | 99.9 |
| 140 | 99.7 |

EXAMPLE 3

Example 1 was repeated in the same manner as described except that the heat treatment time was 4 hours, the heat treatment temperature was 130° C. and the concentration of hydrochloric acid was as shown in Table 3. The lixivation yields at various hydrochloric acid concentrations are shown in Table 3.

TABLE 3

| Hydrochloric Acid Concentration (mol/dm$^3$) | Lixivation Yield (%) |
|---|---|
| 0.5 | 71.4 |
| 1 | 97.2 |
| 2 | 97.6 |
| 3 | 98.0 |
| 4 | 99.0 |
| 6 | 99.9 |
| 8 | 99.5 |
| 10 | 99.6 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of separating copper from chalcopyrite, comprising the steps of:

(a) heating a mixture consisting essentially of chalcopyrite particles containing copper components and hydrochloric acid at a temperature of at least 110° C. for a period of time sufficient to convert the copper components into a water-soluble state, said hydrochloric acid having a concentration of 6–12 mole/dm$^3$; and (b) mixing said heated mixture with water to leach out said water-soluble copper components from said particles into water.

2. A method as claimed in claim 1, wherein said chalcopyrite particles have a particle size of 150 μm or less.

3. A method as claimed in claim 1, wherein step (a) is performed at a temperature of 120–140° C.

4. A method as claimed in claim 1, wherein step (a) is performed 1–6 hours.

5. A method as claimed in claim 1, wherein step (a) is performed 2–4 hours.

6. A method as claimed in claim 1, wherein step (a) is performed in a closed vessel in which said chalcopyrite particles are placed and wherein said hydrochloric acid is used in an amount sufficient for all of said chalcopyrite particles to be immersed in said hydrochloric acid but less than about twice the volume of said chalcopyrite particles.

7. A method as claimed in claim 1, wherein step (b) is performed at ambient temperature.

8. A method as claimed in claim 1, wherein said water is used in an amount providing a pulp concentration of 10–100 g/dm$^3$.

* * * * *